Dec. 2, 1969                 J. E. WALKER                 3,481,469
                        OIL AND WATER SEPARATOR
                        Filed April 13, 1967

INVENTOR
JAMES E. WALKER

BY *Head & Johnson*
ATTORNEYS

United States Patent Office 3,481,469
Patented Dec. 2, 1969

3,481,469
OIL AND WATER SEPARATOR
James E. Walker, 409 E. Third St.,
Big Spring, Tex. 79720
Filed Apr. 13, 1967, Ser. No. 630,705
Int. Cl. B01d 29/36, 29/00
U.S. Cl. 210—96     2 Claims

ABSTRACT OF THE DISCLOSURE

This invention is an oil and water separator having a volumetric container positionable upon a weighing apparatus. The volumetric container includes an adjustable outlet valve at its upper portion which is biased closed as long as the container exceeds a particular weight and which becomes open whenever the weight of the container falls below this weight because of the decrease in specific gravity of the liquids therein. Supernatant oil is permitted to flow through the open valve. The weight of the liquids within the container is approximately proportional to the relative proportions of the oil and water contained therein.

---

This invention relates to an apparatus for use in separating oil and water, and more particularly, to an apparatus for seprating crude oil and water, under pressure from oil wells. Still more particularly, this invention relates to an apparatus for separating oil and water in which the separation is accomplished automatically by reason of the change in weight of the separating apparatus itself.

The production of oil from an oil well is quite often accompanied by the production of water, usually salt water. Two problems are immediately created when salt water accompanies the produced oil. The oil must be economically separated from the accompanying water, and the salt water must be disposed of in a manner that it will not contaminate existing fresh water supplies and in a manner that it will not interfere with the local agriculture. The disposal of salt water is often regulated by statute, and one of the preferred disposal methods is to reinject the salt water into the ground, either in a water flood project or in a permeable zone below the known fresh water strata. Either disposal method requires additional specialized equipment besides that employed in the separation of the oil and water. Separate pumping equipment must be used to direct the separated oil and water to their proper destinations in addition to the pumping equipment used in producing the well.

The primary object of this invention is to provide an apparatus for automatically separating the oil and water produced from a well.

Another object of this invention is to provide an apparatus for automatically separating oil and water under pressure and directing the separated fluids to their proper destinations.

Still another object of this invention is to provide an apparatus for efficiently separating oil and water produced from a well without the need of additional pumping equipment.

Further objects and advantages of the invention will become apparent from the following description and claims, and from the accompanying drawings, wherein:

The invention comprises a pressurizable container which receives the fluids from an oil well and permits these fluids to separate into the oil and water components with the oil forming the upper layer, the container having an outlet valve at its top which impinges against an adjustable valve opening assembly separate from the container. The apparatus is operable by the weight of the fluid container therein, because as long as the container is heavier than a chosen definite weight the outlet remains closed, and as soon as the container becomes lighter than that chosen weight by reason of having an increase in its oil content, the pressure outlet valve moves away from the adjustment spring and the positive pressure within the container then forces the valve closure member away from its seat permitting the oil to flow out from the container. As the container becomes leaner with respect to the oil content, or as water flows in, the container becomes heavier, and the exterior tension spring assembly again contacts the valve closure member to position the closure member on its valve seat and close the outlet valve.

Figure 1:
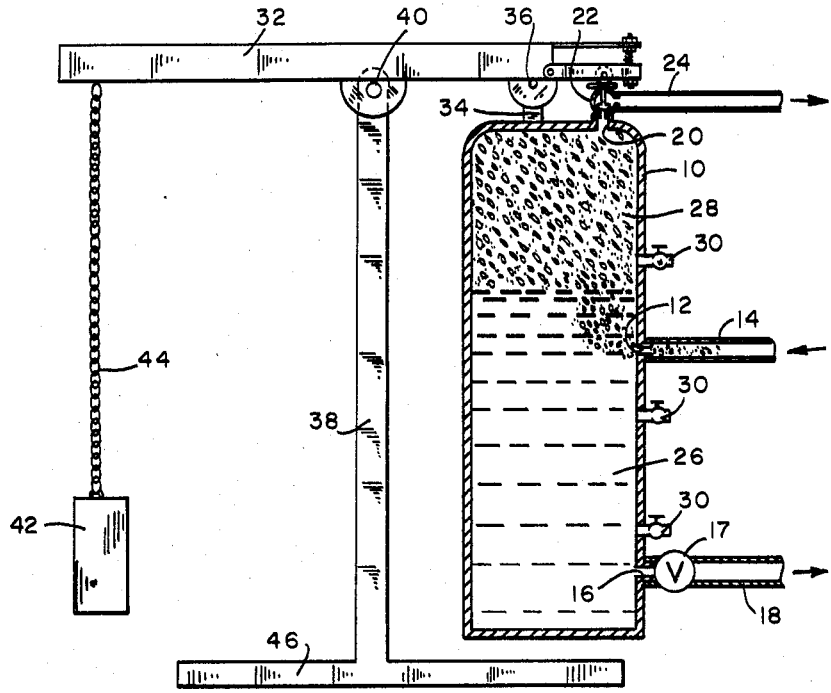
FIGURE 1 is a side elevational view partly in cross section of an oil and water separator according to this invention.

Referring now to the drawings in detail, FIGURE 1 describes a pressurizable container 10 in a counterbalance position upon a supporting frame. The container 10 includes an inlet 12 which communicates with the interior of the container and which receives fluids from an oil well through a flexible hose 14. The fluids from the well are preferably delivered to the pressurizable container 10 under the pressure provided by the pumping equipment at the well head. For the purpose of this invention the fluids preferably are a mixture of oil and water, although as will be described later, a change in composition of the fluids to include the gaseous components will not be a detriment of the operation of the apparatus. Inlet 12 is preferably located near the midpoint of the body of the container, but its position could be changed somewhat depending upon the composition of the produced fluids, since water will be collected in the bottom part of the container and oil will be collected at the upper part. Therefore, inlet 12 could be positioned with consideration to the produced fluids. A water outlet 16 is positioned near the bottom of the pressurizable container 10 and communicates with the interior of the container and with a back pressure valve 17 which controls the flow of fluid through a flexible hose 18. Back pressure valve 17 causes fluid to flow out of the vessel through upper opening 20, unless the upper opening is closed, as will be described subsequently. Because the well fluids enter the container at the pressure with which they are produced, the water leaving the container through flexible hose 18 will also be under pressure, and consequently can be directed either to a nearby water flow project or pumped back underground to a chosen stratum. If the water passing out of the vessel through water outlet 16 is directed to underground injection affording back pressure to the flow of water from the vessel, then back pressure valve 17 may not be required.

An oil outlet 20 is provided at the top of the container and communicates with the interior of the container to permit oil collecting at the top of the container to leave through this outlet. A pressure outlet valve 22 communicates with oil outlet 20 and is an automatically operable valve as will be described in detail hereinafter. A flexible hose 24 is connected to the outlet portion of valve 22 and conducts oil passing through valve 22 to its proper destination.

In FIGURE 1 it is seen that the pressurizable container 10 has been filled with well fluids and that these well fluids have separated into a water layer 26 occupying the lower portion of the container and an oil layer 28 occupying the upper part of the container. To determine the identity and the extent of the fluids in the container, a plurality of test valves 30 are provided. By opening these valves successively or independently a sample may be withdrawn from the container and identified as either oil or water so that the progress of the fluid level within the container and the change of composition of the fluid may be followed.

Container 10 is suspended pivotally to beam 32 by means of hanger 34 positioned bearably about shaft 36 extending through beam 32. Conventional bearings are provided in the connection of hanger 34 to shaft 36 so that the pivotal movement of beam 32 and container 10 may be smooth and frictionless. Beam 32 moves pivotally around an upstanding supporting arm 38 by means of a shaft 40 bearably connecting beam 32 to supporting arm 38. Beam 32 is preferably positioned upon frictionless bearings operating around shaft 40. Counter-balancing container 10 in its movement on beam 32 is an adjustable weight assembly 42 suspended from beam 32 by a chain member 44. Removable weights may be added to or removed from weight assembly 42 so that container 10 when filled with well fluids may be properly counterbalanced as desired based upon the specific gravity of the water and specific gravity of the oil contained therein as well as the relative proportions of the two fluids therein when container 10 is filled. Outstanding supporting arm 38 is connected to a base frame 46 which is shown here as a single horizontal member.

Figure 2:
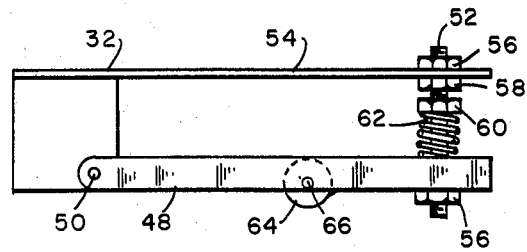
FIGURE 2 is a side elevational view of a pressure adjustment component of this invention.
Figure 3:
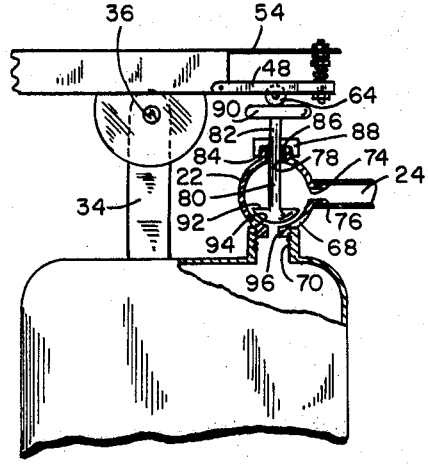
FIGURE 3 is a side elevational view of a top portion of a separator according to this invention with a portion of the valve section shown in cross section.

FIGURES 2 and 3 describe in greater detail the pressure outlet valve 22 as well as adjustment and safety pop-off components relating to valve 22. In FIGURE 2 a valve adjustment arm 48 is pivotally connected to beam 32 by means of shaft 50 preferably by means of frictionless bearings positioned between arm 48 and shaft 50. An adjusting bolt 52 is removably positioned through an extension arm 54 of beam 32 and through an opening in adjusting arm 48. Two adjusting nuts 56 near each end of bolt 52 can be adjusted so as to vary the space between adjusting arm 48 and extension arm 54. An inner adjusting nut 58 is provided below extension arm 54 so as to act as a lock in cooperation with upper adjusting nut 56. A spring adjusting nut 60 is movable on bolt 52 so as to vary the tension of spring 62 surrounding bolt 52 in order that the tension by which arms 48 and 54 are held apart may be varied. By this means then valve 22 may be provided with adjustable closure means. A bearing member 64 is positioned on a shaft 66 extending between sides of arm 48 so that the closure member of valve 22 may bear against bearings 64 instead of against the flat surface of arm 48.

In FIGURE 3 is described in detail the components of valve 22 and it is clearly shown how valve 22 operates. Valve 22 comprises a spherical member 68 having a threaded portion 70 thereon by which spherical member 68 is received threadably into outlet extension 74 communicating with outlet 20. Spherical member 68 also has an outlet 74 adjacent to which is an extension 76 suitable to receive thereon the flexible hose 24. At its upper portion spherical member 68 has a valve closure member opening 78 through which passes in close fitting arrangement shaft 80 of valve closure member 82. A threaded extension 84 receives packing 86 around shaft 80 and is threaded to receive thereon a packing cap 88 which can be adjusted to provide the proper force upon packing 86. At the upper end of valve closure member 82 is a base 90 which provides contact with bearing member 64 of the valve adjusting arm 48. At the lower end of valve closure member 82 is a rounded male valve seat 92 which closes the valve by being forced into contact with female valve seat 94 surrounding passageway 96. The rounded configuration of valve seat 92 is preferred so that continuous contact with valve seat 94 may be had even if the valve closure member 82 becomes slightly out of alignment.

In operation, the pressurizable container 10 receives fluids through flexible hose 14 from the oil well as the well is pumped. Hose 14 is sufficiently flexible so that it does not interfere with vertical movement of container 10. As the fluids from the well flow into the container, back pressure valve 17 prevents flow from the container until container 10 becomes filled. The fluids from the well are composed essentially of oil and water, occasionally with the oil distributed throughout the water either in globules or in an emulsified condition. The relative proportions of oil and water in the well fluids will not interfere with the operation of the separator of this invention, since the separator is designed to be adjustable as needed depending upon the composition of the well fluids. As the container 10 fills with well fluids, the progress of the filling operation can be observed by drawing samples through valves 30. In this manner the level of the fluids in the container can be determined as well as the progressive level of the oil-water interface and the composition of the fluids. When the container becomes filled with well fluids, the fluids exert a pressure against male valve seat 94 in valve 22, and as a consequence of being filled, increases in weight. The amount of counterbalancing weights to be included in the adjustable weight 42 are determined from the consideration of the specific gravity of the produced oil, the specific gravity of the produced water, and the relative proportions of the oil and water desired to be present in the pressurizable container 10 for a most convenient operation. At the chosen point of counterbalance, the pressurizable container 10 will have the desired volume of oil situated above the water layer. As more fluid enters the separator so that the oil separates therefrom and increases the volume of oil in the container 10 with the excess water being carried off through the valve 17, container 10 becomes lighter and the separator becomes unbalanced with regard to weights 42. Adjusting arm 48 moves upward arcuately with beam 32, the tension of spring 62 against arm 48 which holds valve closure member 82 closed against valve seat 94 becomes lessened and the pressure within container 10 overcomes the tension of spring 62 so that valve seat 92 is forced off valve seat 94 and the supernatant oil flows through valve 22 and out flexible hose 24. Then, as the volume of the supernatant oil becomes less, more of the produced water flows into container 10 and container 10 becomes heavier and unbalances the apparatus by becoming heavier than weights 42 and the container drops down slightly lowering arm 48. As arm 48 becomes angled downward, valve seat 92 is again forced against valve seat 94 and the valve is closed preventing the flow of oil therefrom.

Spring 62 also cooperates with arm 48 in forming a pressure safety pop-off component. Spring 62 can be adjustably biased against arm 48 by movement of adjusting nut 60 and adjusting nut 56 to provide any chosen tension. Thus, in an emergency when for some reason liquid fluid pressure in container 10 builds up, or if the produced fluids should suddenly contain gas under pressure, the sudden increase in pressure will overcome the tension of spring 62 and open the valve so that the pressure is released harmlessly through hose 24.

Since many different embodiments of this invention may be made without departing from the spirit and scope thereof, it is to be understood that the specific embodiments described in detail herein are not to be taken in a limiting sense, since the scope of the invention is best defined by the appended claims.

What is claimed is:
1. An oil and water separator comprising:
   an upright vessel having an intermediate inlet opening, an upper oil outlet opening and a lower water outlet opening;
   a horizontal beam pivoted at a point intermediate its end, said vessel being suspended from one end of said beam;
   a weight affixed to said beam at the end thereof opposite said vessel, said weight and said vessel with its fluid contents balancing each other whereby the weight of the fluid content of said vessel causes said beam to pivot in response thereto, said vessel moving upwardly when the proportion of oil therein increases and downwardly when the proportion of water therein increases;

a valve body affixed to the upper end of said vessel, the valve body having a flow passageway therethrough in communication with said vessel oil outlet opening, said passageway being defined in part by a valve seat, said valve body having a valve stem opening therein;

a clapper member in said body movable against said valve seat;

a stem slidably and sealably received in said body valve stem opening, the inner end of said stem affixed to said clapper, the outer end of said stem terminating adjacent to and below said beam whereby as said beam is pivoted by the weight of said vessel and its contents as the proportion of water therein increases said beam engages said stem, moving in downward and closing said clapper against said valve seat; and back pressure means in communication with said water outlet opening whereby fluid flow into said vessel normally causes fluid flow out said oil outlet opening unless said valve is closed.

2. An oil and water separator according to claim 1 including:

resilient means affixed to said beam contacting the outer end of said stem, said resilient means serving to compensate for over travel of said beam after said clapper is closed against said valve seat.

References Cited

UNITED STATES PATENTS

| | | | |
|---|---|---|---|
| 897,161 | 8/1908 | Senter | 210—109 |
| 1,315,662 | 9/1919 | Gouchenour | 210—113 X |
| 1,530,836 | 3/1925 | Kuzilik | 210—114 |

REUBEN FRIEDMAN, Primary Examiner

JOHN W. ADEE, Assistant Examiner

U.S. Cl. X.R.

210—115